Patented June 2, 1936

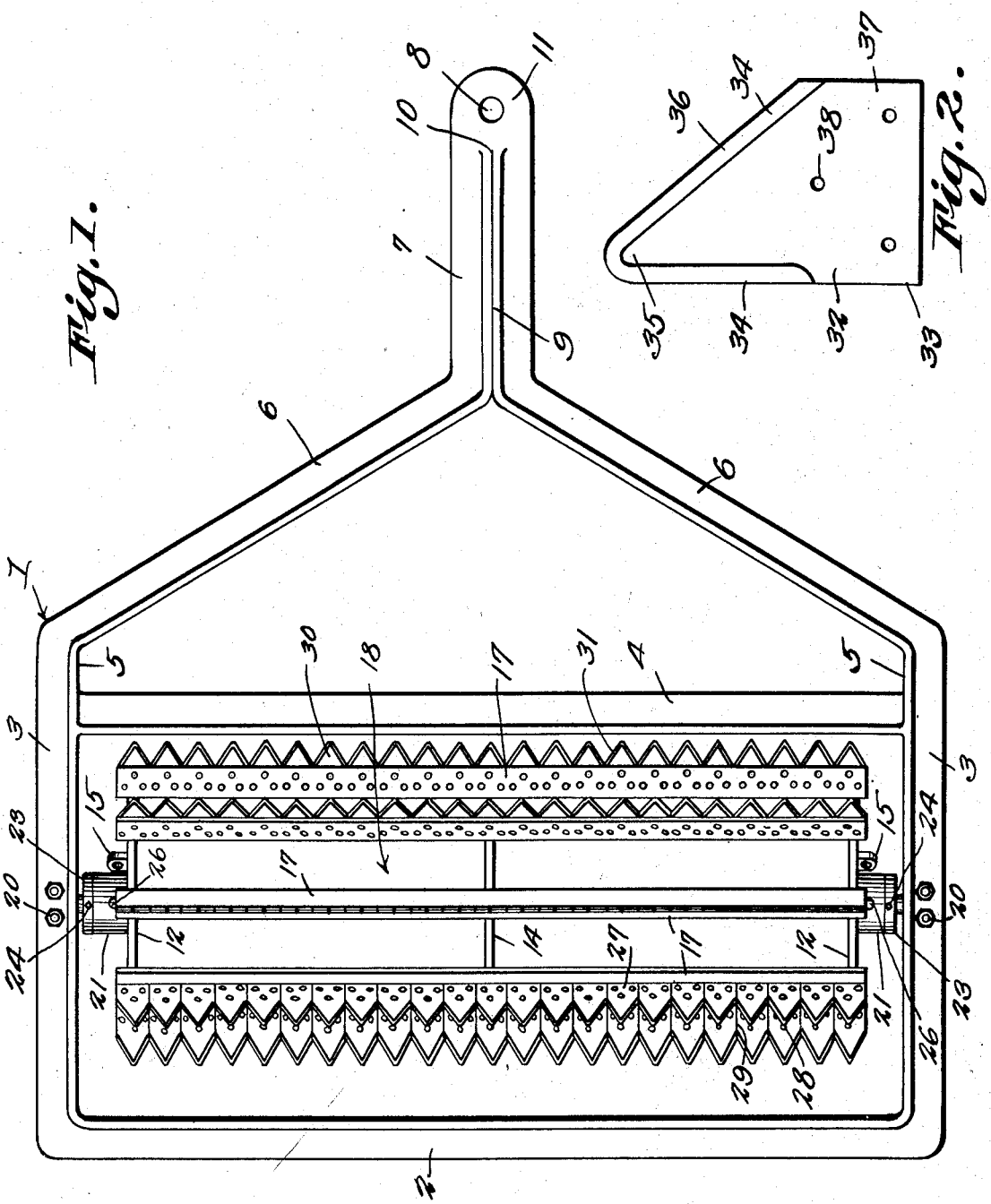
June 2, 1936.  L. BISHOP  2,042,981
COVER CROP CUTTER
Filed March 15, 1935  2 Sheets-Sheet 1
Inventor
Lewis Bishop June 2, 1936.　　　　　L. BISHOP　　　　　2,042,981
COVER CROP CUTTER
Filed March 15, 1935　　　2 Sheets-Sheet 2
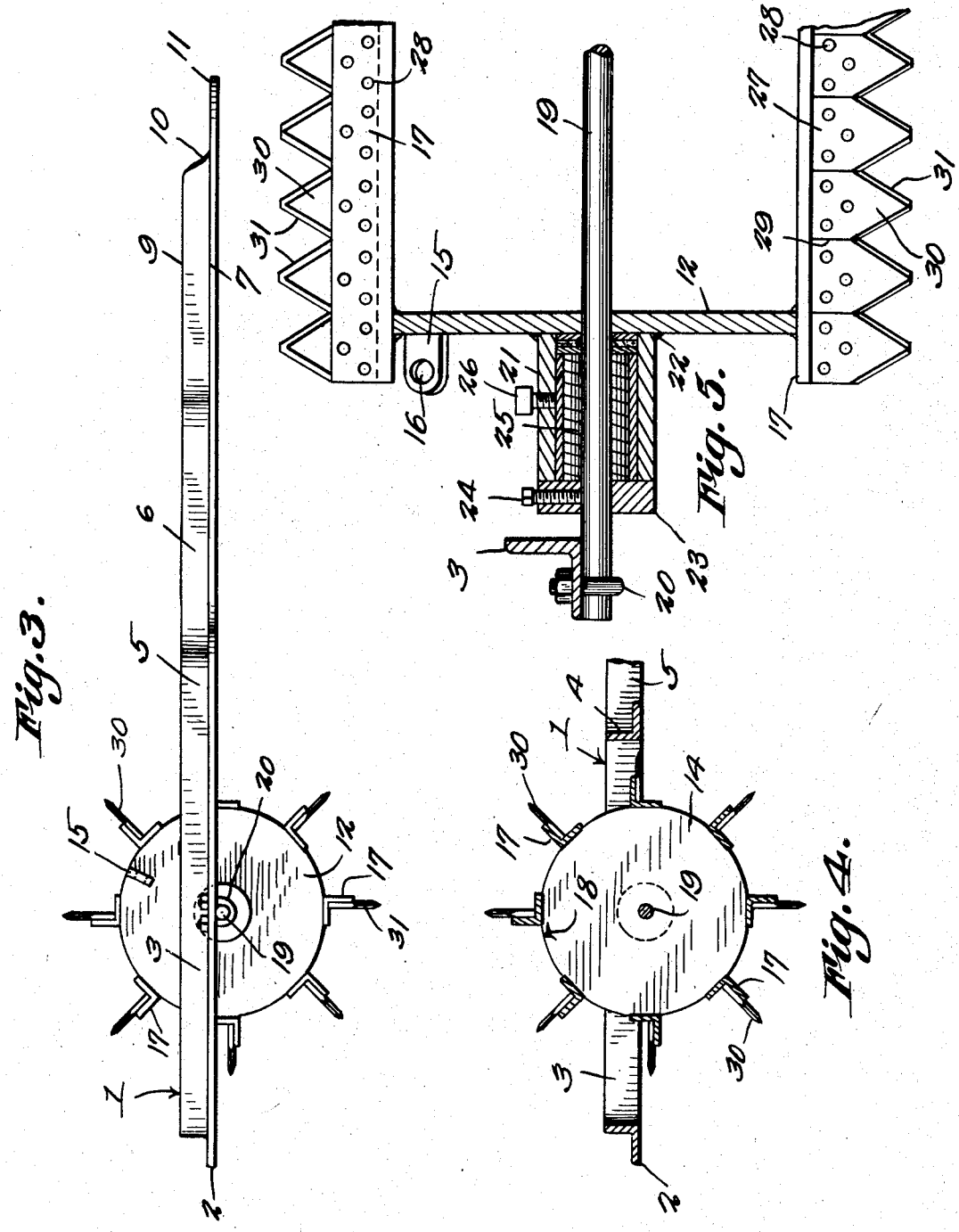
Inventor
Lewis Bishop
By C. A. Snow & Co.
Attorneys.

2,042,981

UNITED STATES PATENT OFFICE 2,042,981

COVER CROP CUTTER

Lewis Bishop, Arcadia, Fla.

Application March 15, 1935, Serial No. 11,354

2 Claims. (Cl. 97—52)

By way of explanation, it may be stated that in orange groves and other groves, it is common to have a cover crop which sometimes consists of a weed from five to eight feet high, known as a beggar weed, combined, of course, with other vegetation. It is difficult to cut up such a cover crop so that it can be plowed under, and the present invention aims to provide a simple and effective means to that end.

It is within the province of the disclosure to improve generally and to enhance the utility of devices of that type to which the invention appertains.

With the above and other objects in view, which will appear as the description proceeds, the invention resides in the combination and arrangements of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows, in top plan, a device constructed in accordance with the invention;

Fig. 2 is a plan showing a modified form of tooth;

Fig. 3 is a side elevation;

Fig. 4 is a vertical longitudinal section, wherein parts are broken away;

Fig. 5 is a horizontal section taken through the cutting drum.

In carrying out the invention, there is provided a frame 1, preferably made of angle stock, including vertical upstanding flanges and horizontal outstanding flanges. The frame may be made in one piece, as is shown in Fig. 1. The frame comprises a loop-shaped head 1, including a rear bar 2 and parallel side members 3, disposed at right angles to the rear bar 2. Near to their forward ends the side members 3 are connected by a front piece 4, disposed parallel to the rear bar 2. The side members 3 are forwardly extended with respect to the front piece 4, as shown at 5, and the extensions 5 merge into inwardly converging arms 6. The arms 6 are prolonged into a forwardly presented tongue 7 located in the median plane of the head 1, and in the draft line. The vertical upstanding flanges of the angle members are brought together, as shown at 9, to form the tongue 7, the forward portions of the said flanges being cut away, as shown at 10, to leave, at the forward end of the tongue 7, a flat plate 11, having an opening 8, whereby the implement may be attached to a tractor, or other source of towing power.

A cutting rotor is provided, and embodies circular end disks 12, and an intermediate disk 14, disposed midway between the end disks. The end disks 12 may be supplied with outstanding lifting lugs 15 having openings 16. The disks 12 and 14 are united at their peripheries by any desired number of longitudinal bars 17 which, preferably, are angle members, including circumferential flanges secured to the peripheries of the disks 12 and 14, and outstanding radial flanges which carry the cutting instrumentalities hereinafter mentioned. The cutting rotor is a rigid structure, embodying the disks 12 and 14 and the bars 17, the rotor being open between the bars 17, as shown at 18.

A shaft 19 passes through the disks 12 and 14 of the cutting rotor, the ends of the shaft being connected by securing devices 20, such as U-bolts, to the horizontal outstanding flanges of the side members 3 of the head 1. Tubular casings 21 are secured by welding shown at 22, or otherwise, to the end disks 12 of the cutting rotor and the shaft passes through the casings 21. Abutments 23 are held by set screws 24 or the like, on the shaft 19, adjacent to the side members 3 of the head 1. The outer ends of the tubular casings 21 engage the abutments 23, and thus the cutting rotor is prevented from shifting lengthwise of the shaft 19. The rotor turns freely on the shaft 19, and to facilitate this turning movement, anti-friction bearings 25, preferably roller bearings, are disposed in the casings 21, about the shaft 19, and between the abutments 23 and the end disks 12 of the rotor. The bearings 25 may be lubricated by dope cups 26, indicated in Fig. 1 and mounted on the casings 21.

Cutting teeth 27 are attached by securing elements 28 to the outstanding radial flanges of the longitudinal bars 17 of the cutting rotor. The teeth 27 having parallel edges 29, which are in abutment, in adjoining teeth. The teeth 27 have symmetrically located, bluntly pointed parts 30, the converging portions of which are sharpened to form cutting edges 31, Fig. 5 shows that the cutting rotor may be said to be provided with longitudinally extended, saw-like cutting members.

The cutting teeth need not be constructed precisely as shown in Fig. 5 and as hereinbefore described. Referring to Fig. 2, the body portion 32 of the modified tooth may be made practically like the body portion of the tooth 27 shown in Fig. 5. As to the point of the modified tooth, however, this point is not located in the median line of the tooth, as shown in Fig. 5, but is located at one transverse edge 33 of the tooth. A portion of the said edge 33 is sharpened, as shown at 34, and the sharpening extends around the point 35 of the tooth, and along the inclined edge 36 of the tooth, to the edge 37 of the tooth, which is parallel to the edge 33. The openings 38 of the tooth shown in Fig. 2 receive the securing elements 28 of Fig. 5, the teeth of Fig. 2 thus being held on the bars 17, the edge 37 of one tooth being in abutment with the edge 33 of the next adjacent tooth, as indicated at 29 in Fig. 5, in connection with the symmetrically formed teeth of that figure.

The implement is not wheel-mounted, but rides on the cutting rotor, with the teeth 27 in engagement with the soil, the cutting edges shown at 31, or at 34 in Fig. 2, serving to cut up the cover crop so that it can be plowed under readily. The device is not a cultivator, although there may be some incidental or accidental moving of the soil by the teeth 27. The device is designed primarily for cutting a cover crop, and will be found peculiarly efficient for that purpose. The drawings show that the implement is of such a construction that it can be made cheaply and be well adapted to withstand long continued and rough use without expert attention.

I claim:

1. A cover-crop cutter comprising a frame, and a cutting rotor journaled on the frame and constituting the sole soil-engaging support for the frame, the rotor comprising spaced disks and angle bars having circumferential flanges and outstanding flanges, the circumferential flanges being secured to the disks, and the outstanding flanges carrying saw-tooth cover crop cutters, the cover crop cutters being located in the angles formed by the circumferential and the outstanding flanges and being separate from the angle bars, the cutters having their lateral edges in abutment, and securing devices connecting the cutters with the outstanding flanges, the cutters abutting at their inner ends against the circumferential flanges.

2. A cover crop cutter comprising a frame, a rotor journaled on the frame and constituting a soil-engaging support for the frame, and saw-tooth cutters carried by the rotor and arranged in lines extending longitudinally of the rotor, each cutter having a long sharpened cutting edge and a short longitudinal edge, arranged in approximately parallel relation, each cutter having a sharpened and inclined transverse cutting edge, the long edge and the inclined edge defining a bluntly-pointed and sharpened portion at the outer end of the long edge, the inclined edge of each cutter leading from the pointed portion of that cutter to the outer end of the short edge of said cutter and to the long sharpened edge of the next adjoining cutter.

LEWIS BISHOP.